(12) United States Patent
Gold

(10) Patent No.: US 7,000,231 B1
(45) Date of Patent: Feb. 14, 2006

(54) METHOD OF MANUFACTURING OPERATING SYSTEM MASTER TEMPLATE, METHOD OF MANUFACTURING A COMPUTER ENTITY AND PRODUCT RESULTING THEREFROM, AND METHOD OF PRODUCING A PRODUCTION VERSION OF AN OPERATING SYSTEM

(75) Inventor: Stephen Gold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 41 days.

(21) Appl. No.: 09/667,516

(22) Filed: Sep. 22, 2000

(51) Int. Cl.
*G06F 9/445* (2006.01)
*G06F 12/00* (2006.01)
*G06F 9/00* (2006.01)

(52) U.S. Cl. .................. 717/174; 717/175; 711/173; 713/2

(58) Field of Classification Search ........... 717/168, 717/171, 174, 175; 711/173; 713/2
See application file for complete search history.

(56) References Cited

U.S. PATENT DOCUMENTS

| | | | | | |
|---|---|---|---|---|---|
| 5,325,532 | A | * | 6/1994 | Crosswy et al. | 717/168 |
| 5,469,573 | A | * | 11/1995 | McGill et al. | 717/127 |
| 5,684,952 | A | * | 11/1997 | Stein | 717/171 |
| 5,745,905 | A | * | 4/1998 | Larsson et al. | 707/203 |
| 5,829,045 | A | * | 10/1998 | Motoyama | 714/7 |
| 5,887,163 | A | * | 3/1999 | Nguyen et al. | 717/169 |
| 6,000,023 | A | * | 12/1999 | Jeon | 711/173 |
| 6,138,179 | A | * | 10/2000 | Chrabaszcz et al. | 717/174 |
| 6,195,695 | B1 | * | 2/2001 | Cheston et al. | 709/221 |
| 6,247,126 | B1 | * | 6/2001 | Beelitz et al. | 713/2 |
| 6,317,845 | B1 | * | 11/2001 | Meyer et al. | 714/23 |
| 6,324,692 | B1 | * | 11/2001 | Fiske | 717/174 |
| 6,351,850 | B1 | * | 2/2002 | van Gilluwe et al. | 717/175 |
| 6,385,766 | B1 | * | 5/2002 | Doran et al. | 717/174 |
| 6,487,464 | B1 | * | 11/2002 | Martinez et al. | 700/79 |
| 6,490,722 | B1 | * | 12/2002 | Barton et al. | 717/174 |
| 6,490,723 | B1 | * | 12/2002 | Bearden et al. | 717/174 |
| 6,615,365 | B1 | * | 9/2003 | Jenevein et al. | 714/6 |
| 6,691,146 | B1 | * | 2/2004 | Armstrong et al. | 718/100 |
| 6,763,458 | B1 | * | 7/2004 | Watanabe et al. | 713/100 |

* cited by examiner

*Primary Examiner*—Wei Y. Zhen
*Assistant Examiner*—Qamrun Nahar

(57) ABSTRACT

A manufacturing system is disclosed for creating a master disk for producing clone copies installed on a plurality of production headless computer entities, said manufacturing system comprising: a build operating system, a set of primary operating system files, a set of emergency operating system files, a set of set-up files, a user interface and a data disk, wherein the manufacturing system creates a master system disk template from the data disk. The master system disk has not less than 3 operating systems, and the master manufacturing system is configured to initialize the master system disk.

21 Claims, 16 Drawing Sheets

METHOD OF MANUFACTURING OPERATING SYSTEM MASTER TEMPLATE, METHOD OF MANUFACTURING A COMPUTER ENTITY AND PRODUCT RESULTING THEREFROM, AND METHOD OF PRODUCING A PRODUCTION VERSION OF AN OPERATING SYSTEM

FIELD OF THE INVENTION

The present invention relates to the field of computers and, particularly although not exclusively, to a method of manufacturing master disks for use in headless computer entities, including master system disks and master data disks.

BACKGROUND TO THE INVENTION

A conventional computer entity typically comprises a casing containing a processor, memory input/output ports and the like, a video monitor, a keyboard, and a tactile device for driving a graphical user interface, e.g. a mouse, trackball device or the like. Such prior art computers are well-known.

Another type of known computer entity is a headless computer entity, also called a "headless appliance". Headless computer entities to prevent direct administration as they do not have a monitor, mouse or keyboard and therefore no means are provided to allow direct human intervention.

Headless computer entities have an advantage of relatively lower cost due to the absence of monitor, keyboard and mouse devices.

However, because headless computer entities do not have conventional user interfaces for human interaction, and generally do not have ports by which conventional keyboard or video monitors can be connected, this creates problems in manufacture of headless appliances, particularly in loading of operating systems and software into such devices, and in making sure that the device is self-correcting and reliable, since maintenance of the device by an end customer will not be practicable, and any faults will result in a service call out from a manufacturer of the device.

A key manufacturing problem with a headless appliance is how to create a cloneable "master disk" image for easy manufacturing. Requirements of this master disk image are that it needs to have all the appliance software pre-installed and it also needs to have a guaranteed uncorrupted copy of the primary operating system and default application data to be used as the operating system backup. However, the very nature of the headless appliance is to prevent direct administration. This therefore means that there are no means available to manually install any applications, or create a copy of the primary operating system. Moreover, the copy of the primary operating system must be a guaranteed uncorrupted back-up version. To obtain a guaranteed uncorrupted copy of the primary operating system requires that the primary operating system is not running at the time it is copied. For example, if the primary operating system was running at the time a copy of it was being made certain files would not be copied as these would be running and locked open, therefore resulting in a primary operating system copy having a large number of files missing.

An additional problem associated with manufacturing master disks for headless appliances is that valuable appliance disk space is used unnecessarily by application set up files, these set up files being for example software set up files which are used to install software on an appliance during manufacture. Currently such set up files are removed manually from the headless appliance via a user interface connected to the headless appliance. This removal of the set up files is performed during manufacturing at the expense of time and human resource.

Additional constraints on the manufacturing process require that the first time a master disk is booted after manufacture, it is required to generate a unique system identification (SID), for example, a Windows/NT® system identification. However, the very act of booting the primary operating system in the manufacturing process during preinstallation of the application software will set the system identification. The consequence of a master disk for use in a headless appliance configured with a set system identification is that when the master disk is cloned, at the final stages of the manufacturing process, every headless appliance configured with master disk will have an identical system identification. Additionally, following the creation of an operating system back-up, if the operating system backup is required to perform an operating system rebuild the final stages of this rebuild process requires that a unique system identification is created. This therefore requires that when the operating system back-up is created in the manufacturing process it must be in a state such that upon its first boot it will generate a unique system identification.

Prior art approaches to the above problems involve the utilization of multiple personal computers (PCs) and involve many complex steps relying heavily upon human administration. Such prior art approaches are considerably time consuming, requiring the connecting and disconnecting of hardware to the headless appliance and the manipulation of the headless appliance's electronic configuration. Prior art solutions to the above problems create unreliable corrupted master disks due to the requirement for human intervention. The effect of the creation of unreliable master disks has severe cost implications as subsequently cloned master disks inevitably contain the same defects as the master disk from which the cloning was performed. In an attempt to address this problem, extensive checking of the master disk after the manufacturing process is performed prior to cloning. Such checking of the master disk must be conducted for each individual disk as each disk is subject to separate defects stemming from human intervention.

There is a need therefore for an improved method of manufacturing master disks that minimises or eliminates the need for human intervention during the manufacturing process. What is required is an automated manufacturing or build process that considerably reduces the amount of human intervention prior to the cloning of the master disk. The implementation of an automated build process that satisfies all the above requirements of the headless appliance will both alleviate the errors incurred in the manufacturing process due to human intervention and will reduce the time and cost involved in the manufacturing of master disks for use in headless appliances.

SUMMARY OF THE INVENTION

In a specific implementation of the present invention there is provided an automated manufacturing process for the production of master disks. The resulting master disk, from the manufacturing system as described herein, has all the required applications fully installed, such that the application set up files have been deleted post installation thus maximizing available disk space. The primary operating system of the resulting master disk is configured such that on the first boot within, for example, a customer appliance, a unique system identification will be generated. The master disk contains a guaranteed uncorrupted copy of the operating system in addition to an emergency operating system configured with a general system identification. The resulting master disk is capable of being cloned post manufacturing so that the resulting cloned master disk can be installed into an appliance, for example a customer appliance, and booted so as to generate a unique system identification thus providing a fully operational uniquely identified system.

The inventors have realized that the use of an automated manufacturing system for the production of master disks used in headless appliances irradicates defects which are otherwise found in master disks manufactured from a process with considerable human intervention. The automated system described herein is advantageous over prior art manufacturing systems as according to specific implementations of the present invention described herein master disks can be generated in bulk to an exact same specification without the inclusion of defects. Accordingly, the amount of time and money associated with master disks manufactured from the prior art processes, are considerably reduced.

A primary operating system is used to automatically pre-install one or a plurality of applications, using an unattending installation. A utility can then be used to reset a system identification of the computer entity, before switching to a secondary operating system to complete a build process.

Using a "scratch" partition on a data storage device of a manufactured computer entity to store application set up files, enables the set up files to be deleted after application installation has been completed to the computer entity. Consequently, disk space on the manufactured computer entity can be saved, by not having to create a primary operating system volume which is big enough for an operating system and installed applications as well as application set up files.

A build process under control of a secondary "emergency" operating system can copy a fully installed primary operating system onto an operating system back-up volume. Since the primary operating system is not running, this guarantees creation of an uncorrupted complete copy of the primary operating system. Further, system identification is set to regenerate a unique system identification on a next boot of the computer entity.

Switching to a secondary "emergency" operating system may have the beneficial effect of initializing a system identification of the secondary emergency operating system (which involves a reboot). This therefore saves a user seeing an extra reboot when they first trigger an operating system rebuild.

According to a first aspect of the present invention there is provided a method of manufacture of an operating system master disk template for installing at least one operating system onto a computer entity, said manufacturing method comprising the steps of:

building a primary operating system on a first partition of a data storage device;

building a secondary operating system on a second partition of said data storage device; and building an installation component on a third partition of said data storage device.

According to a second aspect of the present invention there is provided a method of manufacture of a computer entity, said computer entity comprising at least one data processor and at least one data storage device, said method characterised by the steps of:

partitioning said data storage device into a plurality of partitions;

installing a primary operating system onto a first said partition of said data storage device;

installing a secondary operating system onto a secondary said partition of said data device;

installing an initialisation component onto a third partition of said data storage device; and after installation of said primary and secondary operating systems, deleting said installation component.

The invention includes a computer entity product comprising a data storage device, said computer entity manufactured by a method comprising the steps of:

partitioning said data storage device into a plurality of partitions;

installing a primary operating system onto a first partition of said data storage device;

installing a secondary operating system onto a secondary said partition of said data storage device;

installing an installation component onto a third partition of said data storage device; and after installation of said primary and secondary operating systems, deleting a said installation component from said data storage device.

According to a third aspect of the present invention there is provided a method of producing a production version of an operating system for installation into a production version computer entity, said method comprising the steps of:

creating an operating system master disk template having a plurality of partitions, wherein a primary operating system is stored on a first said partitions, a secondary operating system is stored on a second said partition, and an installation component is stored on a third said partition;

loading said master disk template into a mastering computer entity to create an image of said master disk template on said mastering computer entity; and replicating said master disk image by loading said master disk image from said mastering computer entity onto said production computer entity.

Other aspects of the invention and further features according to the invention are described in the claims appended hereto.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, there is disclosed an apparatus and method for creating a data template containing a primary and secondary operating system, which is suitable for self-installation onto a production computer entity. Whilst the embodiments have been described in terms of storing the master template data on a physical disk, in principal any data storage device having enough data storage capacity to store the master template data can be used as the medium for carrying the master template data, and similarly for a master image data arising from the master template data. In this specification references to the term "disk" shall be construed as a reference to any data storage device which is equivalent to a disk.

Figure 1:
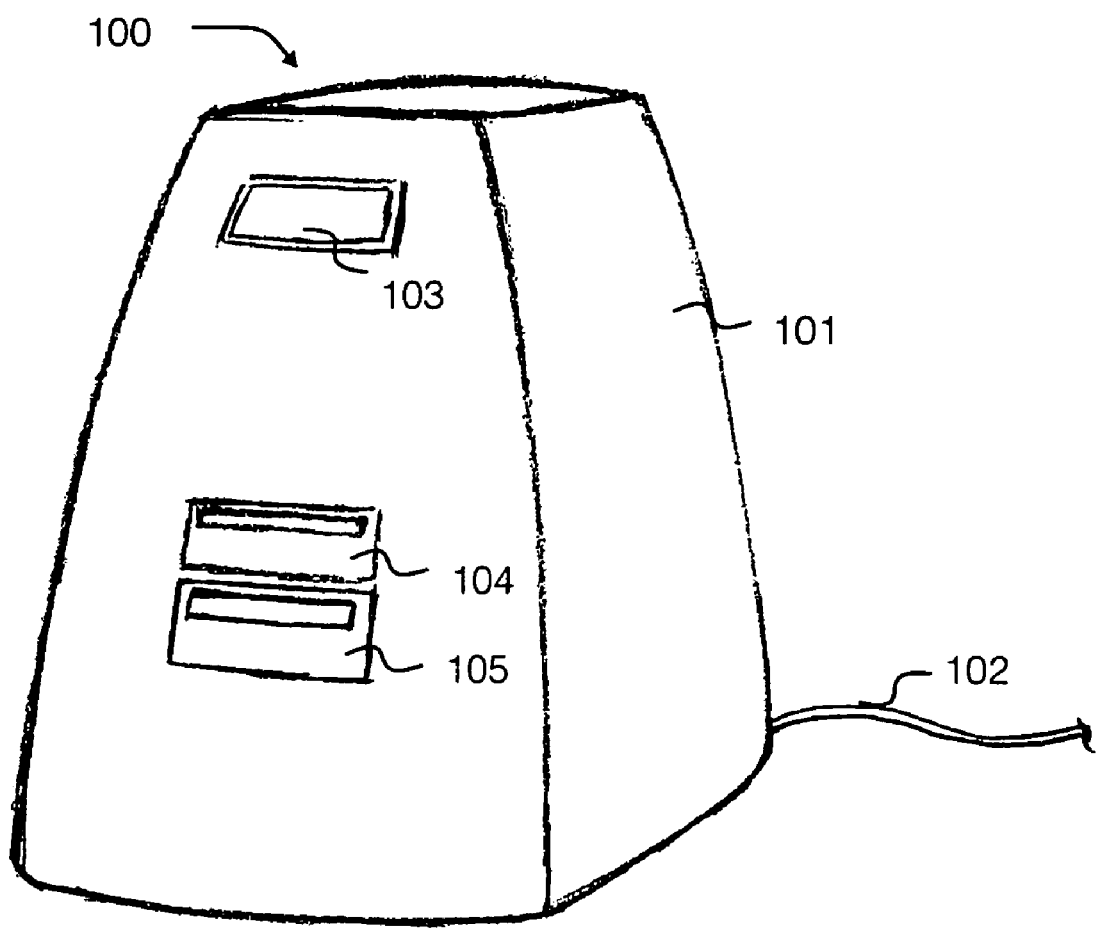
FIG. 1 illustrates schematically a headless computer entity being without a monitor, keyboard or mouse.

Referring to FIG. 1 herein there is illustrated in perspective view, a typical headless computer entity 100, for example a network attached storage device (NAS). The headless computer entity comprises a casing 101, containing a processor, memory, data storage devices e.g. a hard disk, or a RAID array of disks, or a disk mirror arrangement and a communications port connectable to a local area network cable 102; a small display, for example a liquid crystal display (LCD) 103 giving limited information on a status of the device, for example POWER ON, STANDBY or other modes of operation; optionally, a CD ROM drive 104, and optionally back-up tape data storage device 105. Otherwise the headless computer entity has no user interface, and is self-maintaining when in operation. Direct human intervention with the headless computer entity is restricted by the lack of user interface. In operation, the headless computer entity is intended to be self-managing and self-maintaining.

Figure 2:
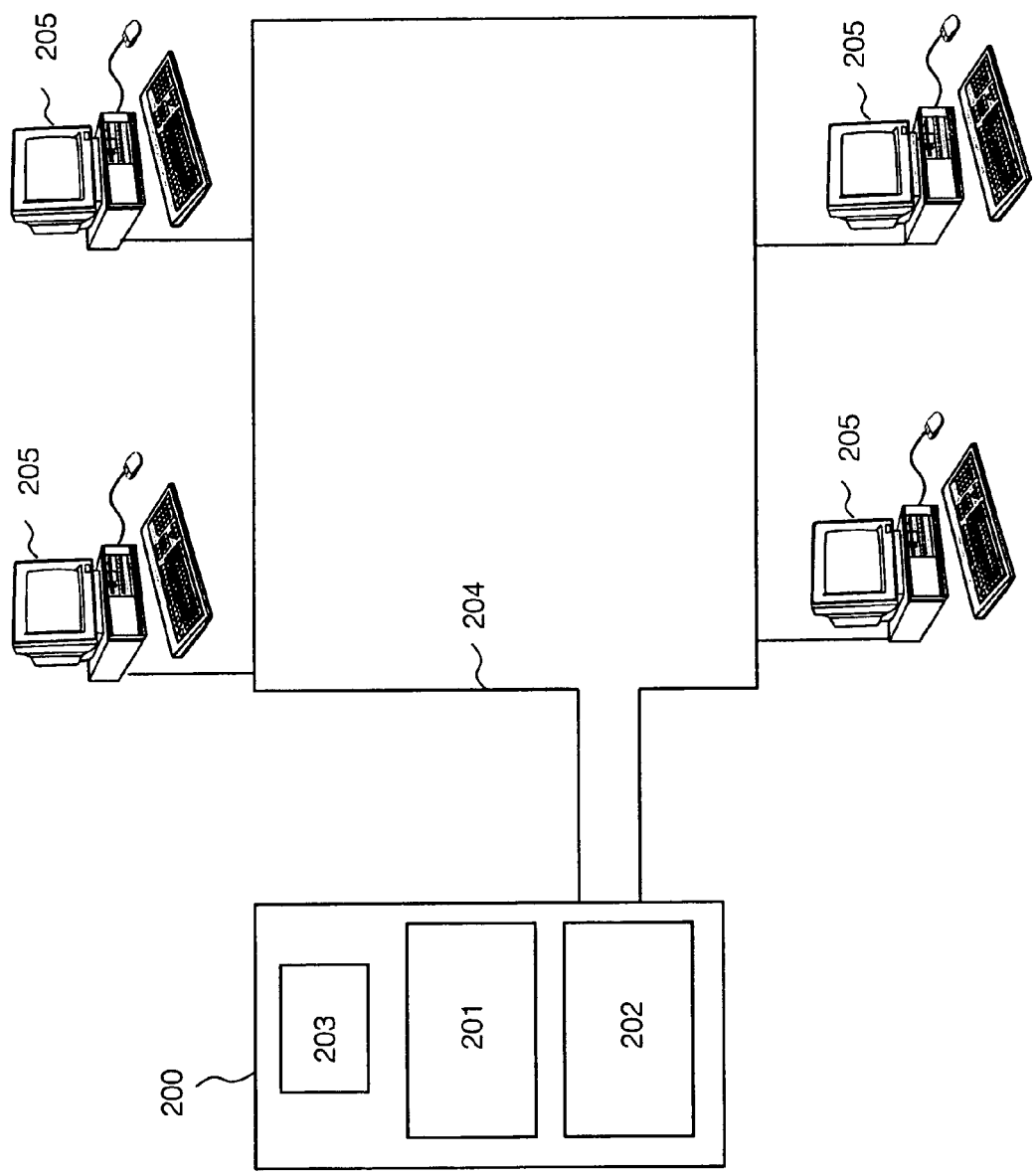
FIG. 2 illustrates schematically a deployment of a headless computer entity in a network of computers.

Referring to FIG. 2 herein there is illustrated a headless computer entity 200 in a network environment. The headless computer entity 200 has hardware configuration 201 comprising a system disk 202 and a liquid crystal display (LCD) 203. Headless computer 200 is connected via suitable network connecting means 204 to a network of computers 205. The very nature of the headless computer 200, not allowing human intervention, requires that system disk 201 is configured for use immediately upon installation within computer 200. It is therefore a requirement of the system disk 202 to be configured with software that will allow computer 200 to function within the network of computers 205. System disk 202 is further configured with a first operating system and further second operating system that functions in the event of the primary operating system failing. Additional components of the computer entity are described in detail below.

Figure 3:
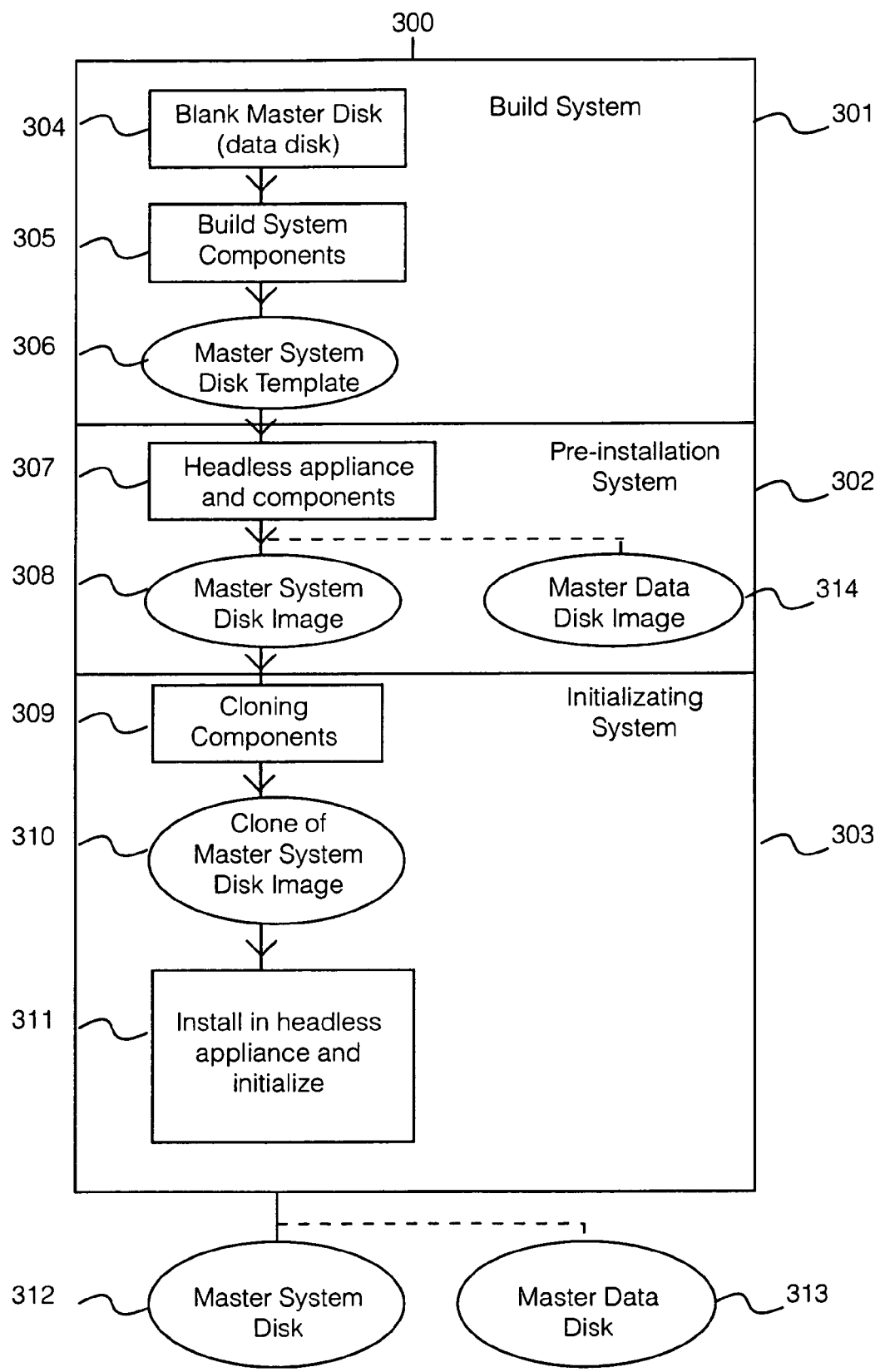
FIG. 3 illustrates a flow diagram detailing a disk manufacturing system according to a specific implementation of the present invention.

Referring to FIG. 3 herein there is illustrated a flow diagram detailing three main stages of a master disk manufacturing system 300 described herein. The manufacturing system 300 comprises a build system 301, a pre-installation system 302 and an initializing system 303.

The build system includes a blank master disk or data disk 304 together with build system components 305. The build system components 305 are described in detail below and include, for example, a user interface, operating system files, and set up files. A product of the build system is the manufacture of a master system disk template 306, this master system disk template 306 is configured with a partition architecture and the necessary files to become at a later stage in the manufacturing system, a master disk for use in a headless computer entity. The build system is physically resident on a conventional computer entity comprising a data processor, memory, and non-volatile data storage device, e.g. hard disk drive. The master system disk template 306 is created on the internal data storage device of the build system computer entity.

The master system disk template 306 is subsequently manually installed in a headless computer appliance 307, this headless appliance 307 having a hardware configuration, software, and LCD and other components described in detail below. Partition structures on a data storage device of the headless appliance 307 are created, and operating system files which have been built by the build system, resulting in the master system disk template, are copied onto the partition data storage device of the headless appliance 307. The operating system comprises a primary operating system; a secondary (emergency) operating system; a plurality of drivers, and a pre-installation component which controls cloning of the master system disk image, and controls installation in a manufactured headless appliance. A product of the pre-installation system 302 is the creation of a master system disk image 308 and/or a master data disk image 314.

Initializing comprises cloning the master system disk, using cloning components 309 thus generating a plurality of cloned master system disks 310. A clone of a master system disk image 310 is then installed into a headless appliance 200 and initialized at stage 311. The initializing of a master system disk image and/or a clone of the master system disk image 308 and 310 respectively generates a specific system identification of the hardware configuration 201 of the headless appliance 200. The end result of the manufacturing process 300 is an initialized master system disk 312 and in certain specific implementations of the present invention, an initialized master data disk 313.

Figure 4:
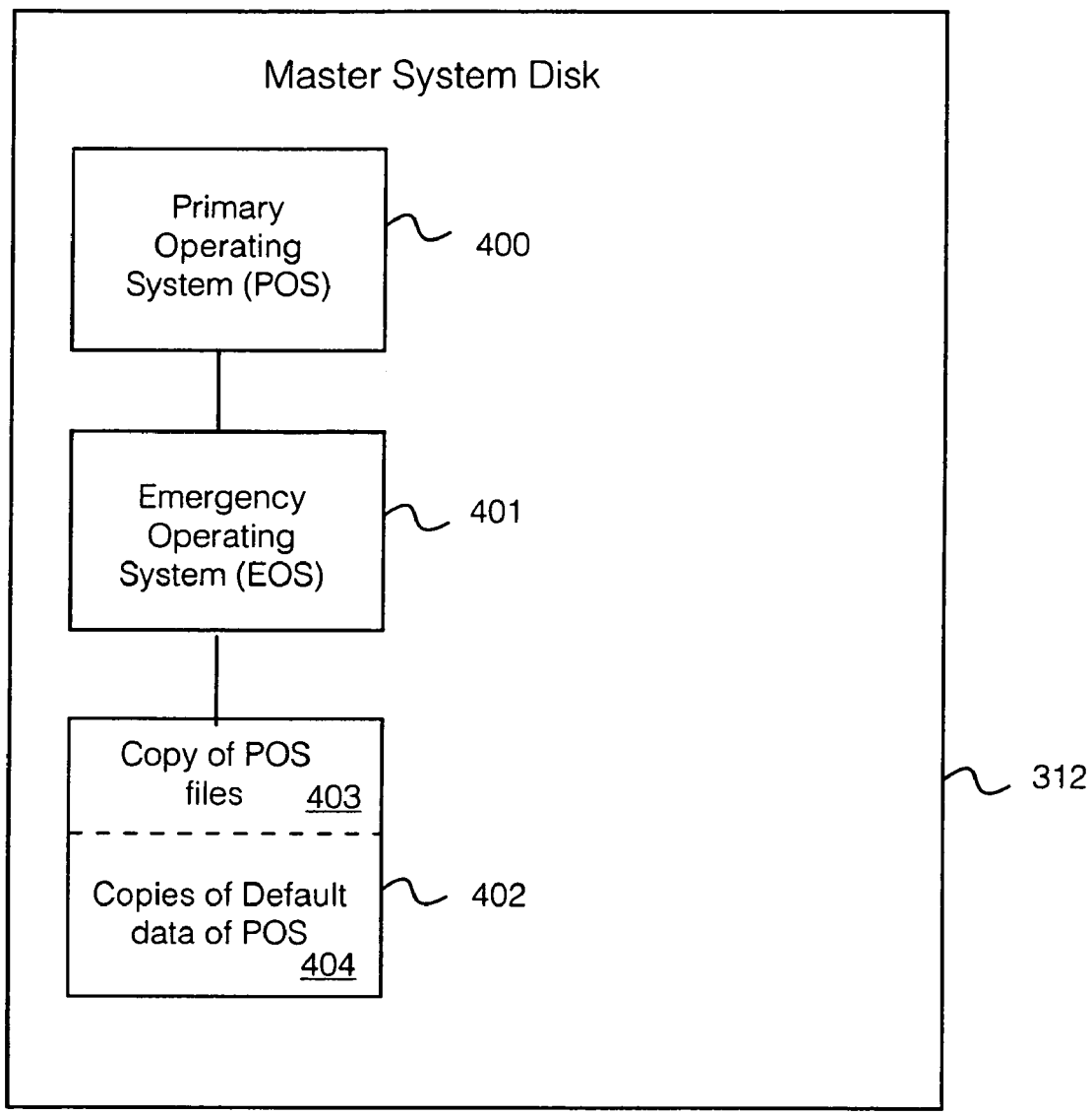
FIG. 4 illustrates the composition of a master system disk.

Referring to FIG. 4 herein there are illustrated main components of the master system disk 312, which enable the automated nature of the pre-installation system 302 and initializing system 303. The master system disk 312 and a master system disk image 308 comprise a primary operating system (POS) 400, an emergency operating system (EOS) 401 and a known good uncorrupted full copy of the primary operating system 402. The known good uncorrupted copy of the primary operating system comprises, for example, a copy of the primary operating system files 403 and copies of default data of the primary operating system 404. The primary operating system is effectively the running "live" operating system, the emergency operating system comprises a "cut down version" of the primary operating system such that if the primary operating system fails, the emergency operating system is configured to continue the running the headless appliance 200. In the event of a failure of the headless computer, the primary operating system copy 402 is used to rebuild the primary operating system 400. The primary operating system copy 402 includes all the necessary components to fully rebuild the primary operating system including, for example, the default data of the primary operating system 404 and the primary operating system data bases. It is a feature of the pre-installation system 302 forming part of the master disk manufacturing system 300, such that a space is created on the master disk and master disk image to accommodate the primary operating system copy 402 and its default data and databases 404.

Figure 5:
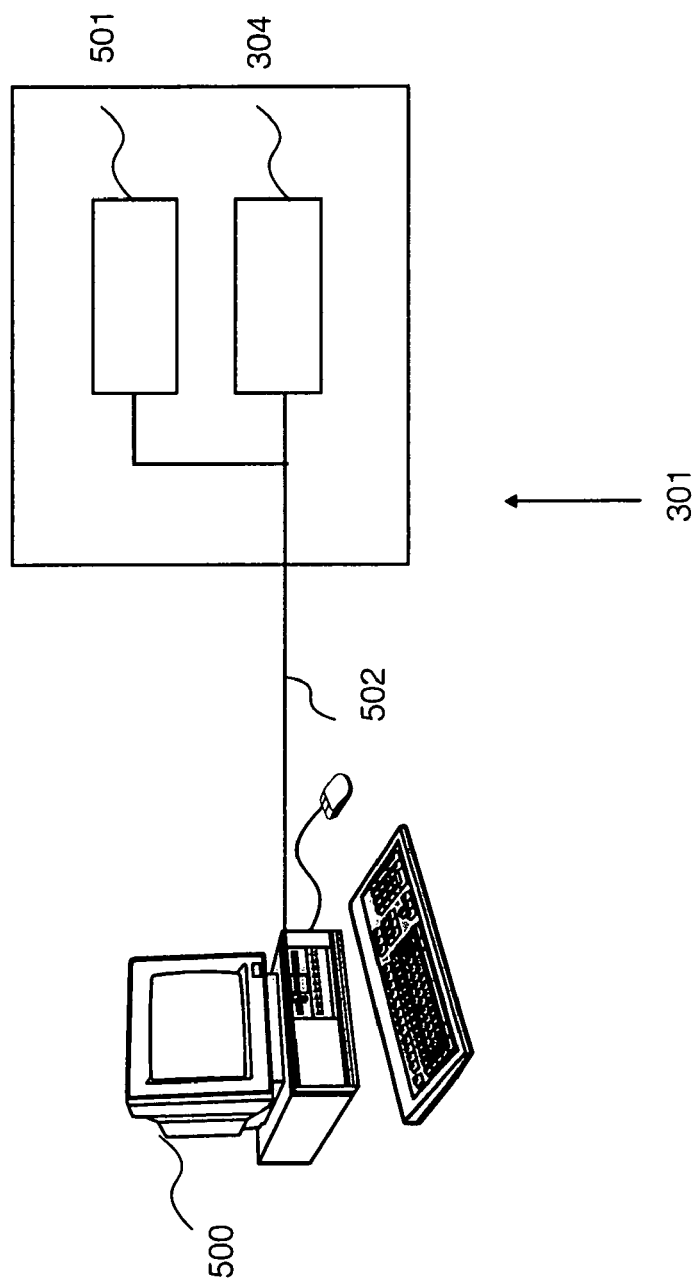
FIG. 5 illustrates schematically selected components of a build system configured to create a master system disk template.

Referring to FIG. 5 herein there is illustrated schematically components 305 of the build system 301 forming part of the complete master disk manufacturing system 300. The build system 301 comprises a user interface 500 connected to a build operating system 501 and a blank master disk (data disk) 304, these components being connected via suitable communications cable 502, being any suitable network connection or direct electronic connection. A user of the manufacturing system via the user interface 500 selects components of the build operating system 501 to be included on the blank master disk (data disk) which following the build system process will be built into a master system disk template. The user copies the necessary files of the primary operating system and emergency operating system together with any drivers and other components necessary to provide a template for a master system disk and/or a master data disk. For example, the build operating system 501 may comprise windows/NT®. The final product of the build process 301 is a compilable version of the build operating system 501, such that a master system disk template is created to the users specification.

Figure 6:
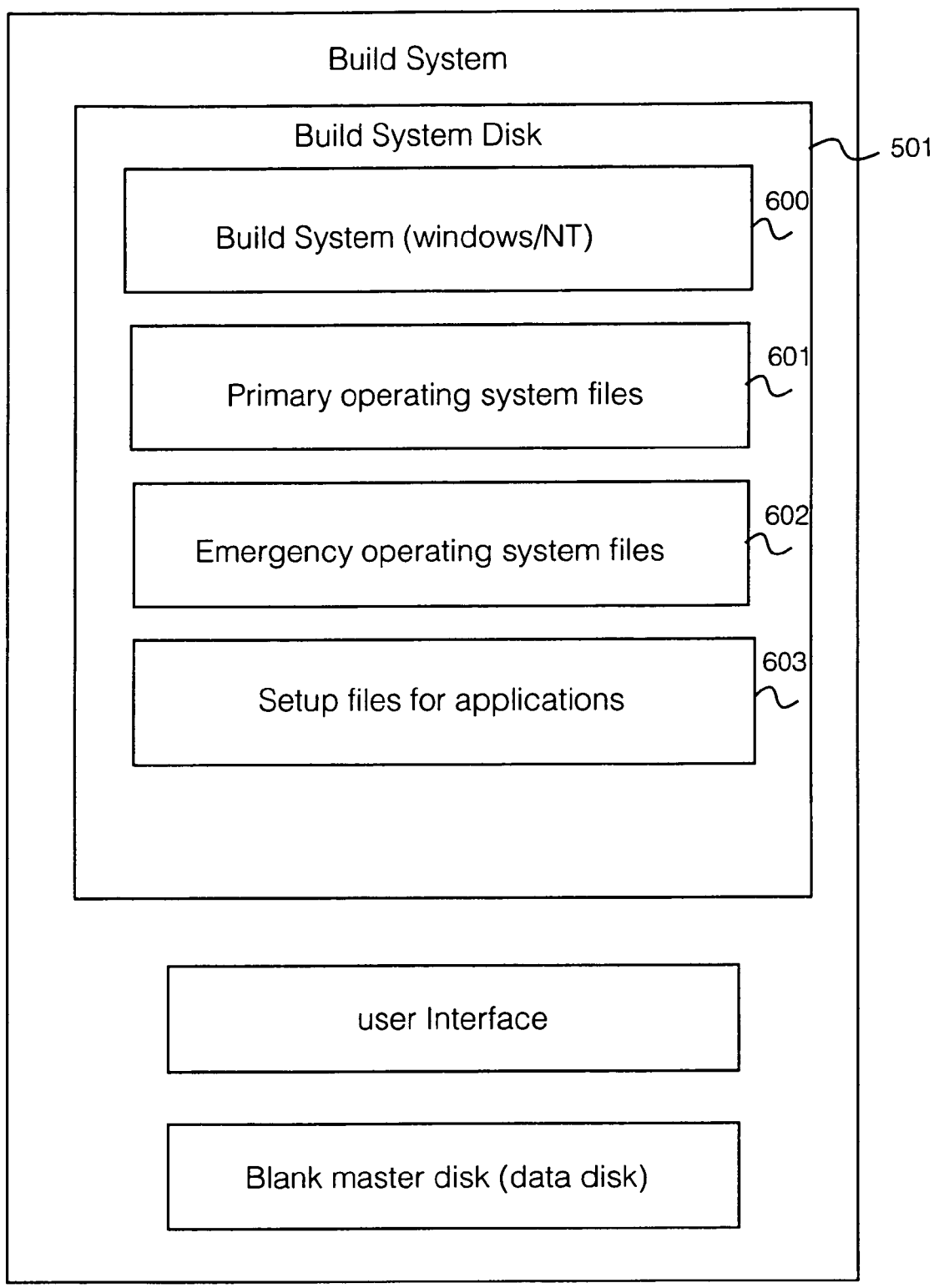
FIG. 6 illustrates schematically further details of the build system.

Referring to FIG. 6 herein there is illustrated a further representation of components 305 of build system 301. The build system disk 501 comprises a build operating system 600, for example Windows/NT®, the primary operation system files 601, emergency operating system files 602 and set up files for application software 603. Application software includes pre-installation code used in the pre-installation system 302 (this code is discussed in more detail below) and application software for use in a headless computer entity 200 when in operation, for example, within a computer network as shown in FIG. 2.

Figure 7:
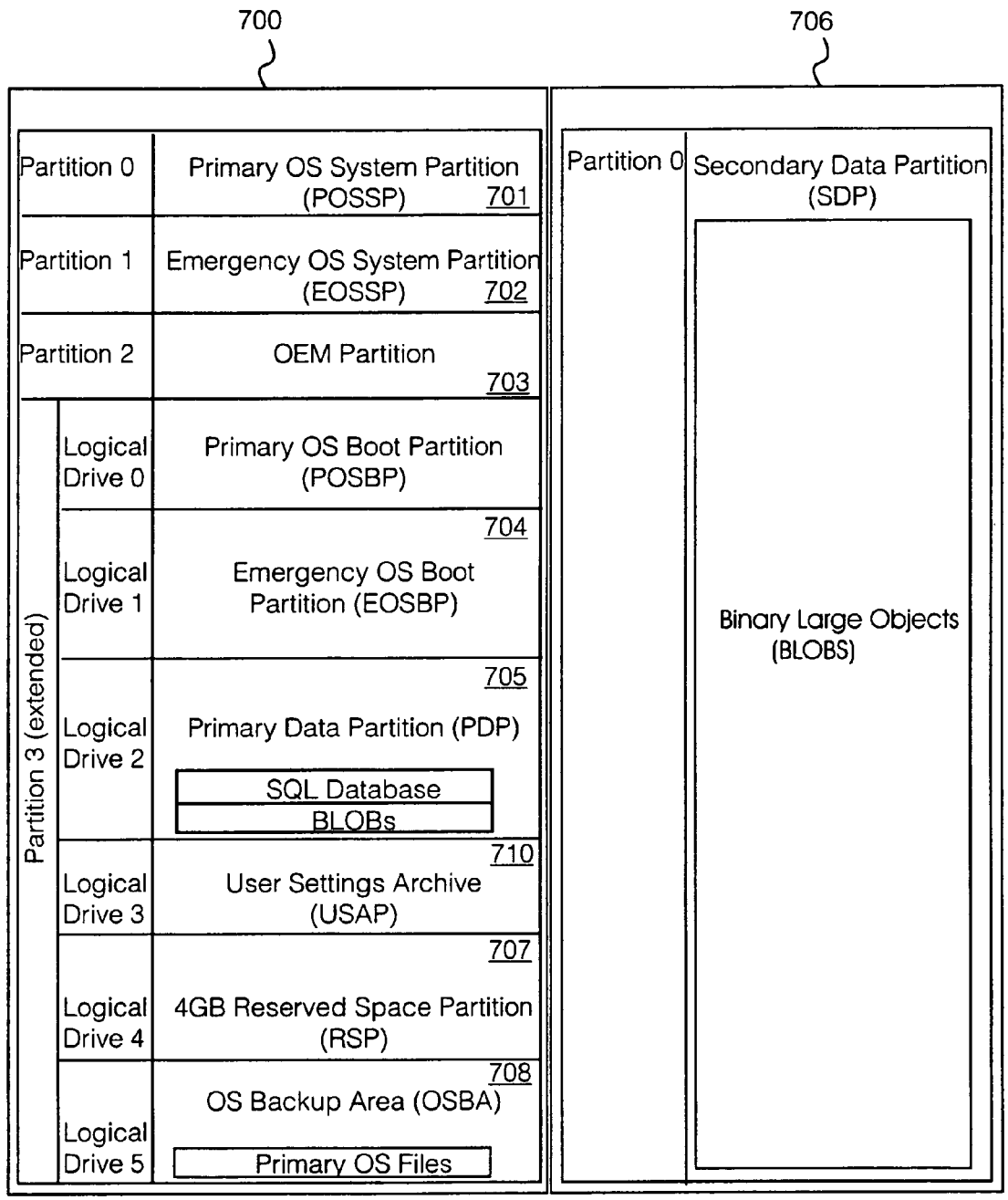
FIG. 7 illustrates schematically a partition architecture of a master system disk template, master data disk template, master system disk, and a master data disk.

Referring to FIG. 7 herein there is illustrated the master disk partition architecture detailing the various partitions and the various sub partitions referred to herein as "logical drives". The disk architecture of a master system disk template and a master data disk template referred to herein, comprises a primary partition 700 containing a primary operating system system partition (POSSP) 701; an emergency operating system system partition (EOSSP) 702; a primary operating system boot partition (POSBP) 703; an emergency operating system boot partition (EOSBP) 704; a primary data partition (PDP) 705; a secondary data partition (SDP) 706; a reserved space partition (RSP) 707; and an operating system back-up area (OSBA) 708. The primary data partition 705 includes, for example, database application SQL data and the data, this data being, for example, binary large objects (BLOBs) 709.

The primary operating system files 601 are divided between the primary operating system system partition 701, the primary operating system boot partition 703, the primary data partition 705 and the secondary data partition 706. The emergency operating system files 602 are divided between the emergency operating system system partition 702, the emergency operating system boot partition 704, and if required a suitable data partition. A user settings archive (USAP) 710 contains the operating system and application configuration settings which are required when the emergency operating system rebuilds the primary operating system using the contents of the operating system back-up area 708. The operating system back-up area contents are described below in FIG. 8. In addition to the emergency operating system the contents of the primary data partition 705 which comprise the primary operating system data are key components responsible for the creation of the operating system back-up area 708 and its contents.

The reserved space partition 707 contains the set up files 603, these files being software installation files. In addition, the reserved space partition also contains the SQL server set up files. The location of the set up files 603 within the reserved space partition 707 allows the set up files to be deleted following the installation of the necessary software. The process of deleting the set up files optimizes the available disk space to the user of the headless computer entity 105 and also helps to prevent acts of piracy.

Figure 8:
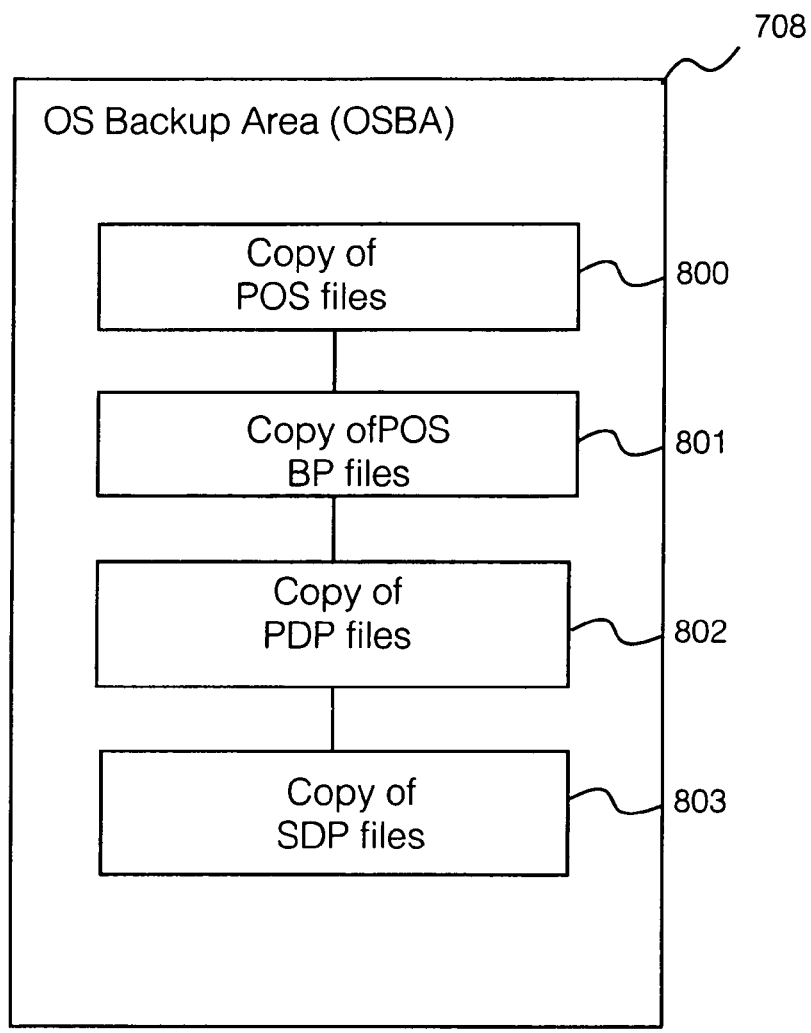
FIG. 8 illustrates schematically selected components of an operating system back-up area.

Referring to FIG. 8 there is illustrated details of the main components of the operating system back-up area 708. Following the build system 301 and the pre-installation system 302, the operating system back-up area contains a copy of the primary operating system files 800, a copy of the primary operating system boot partition files 801, a copy of the primary data partition files 802 and a copy of the secondary data partition files 803. Copies of the files within the operating system back-up area 708 are made when the primary operating system is not running and is therefore not in a 'live' stage. The operating system back-up area 708 contains everything required to rebuild the primary operating system partitions and everything required to rebuild the data partitions into a manufacturing state.

Figure 9:
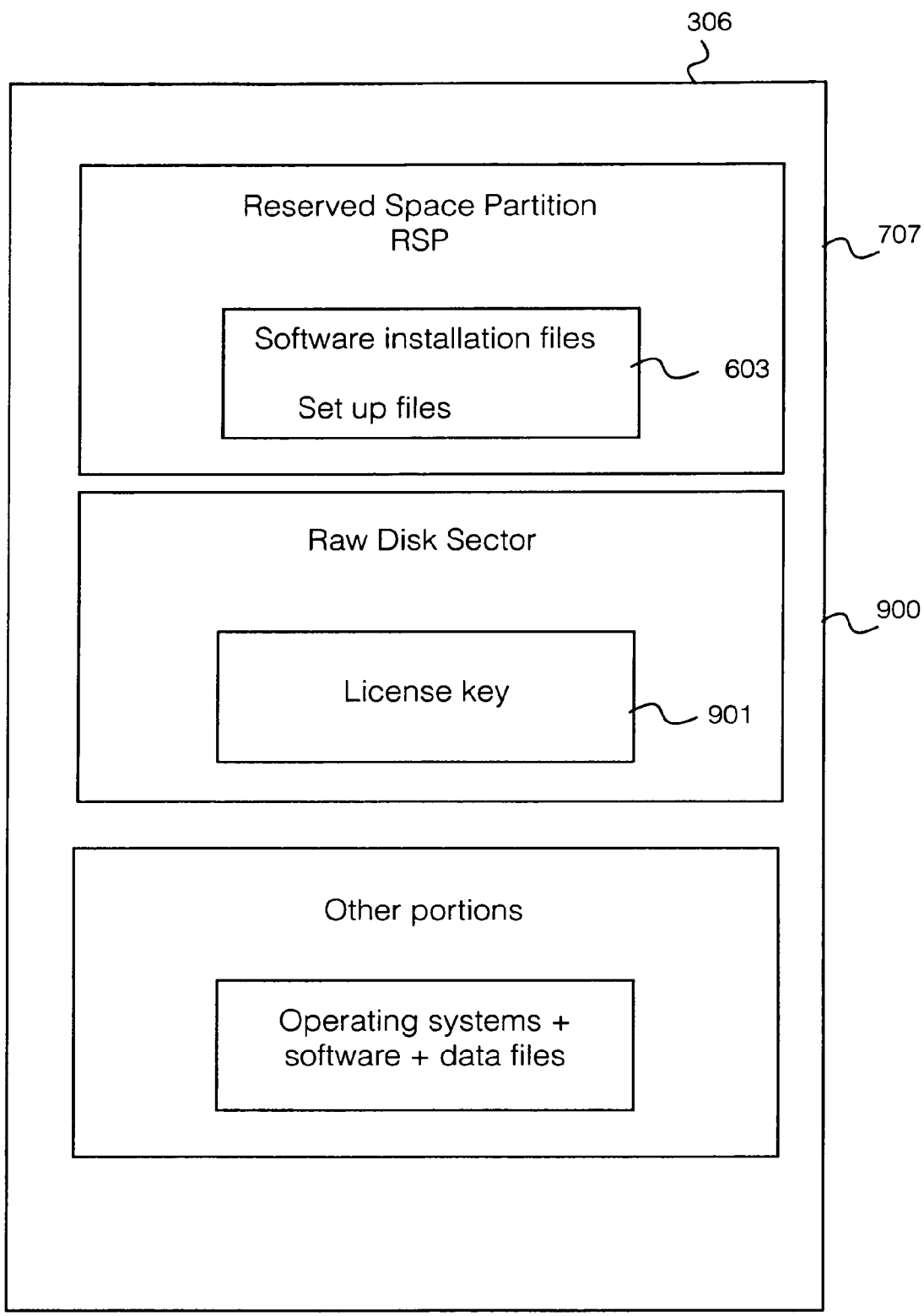
FIG. 9 illustrates schematically selected components of a master system disk template, master data disk template, master system disk and master data disk.

Referring to FIG. 9 herein there is illustrated selected components of the master system disk template 306. On a raw disk sector 900 of the master system disk template the build system 301 is configured to create a license key 901 such that this license key being on the raw disk sector 900 is not logically visible to a user accessing the master system disk of a headless computer entity. The license or software key 901 is configured to be outside the software re-build process, therefore, when it is required that the emergency operating system rebuilds the primary operating system from the operating system back-up area the license key 901 is retained. This serves as an anti-piracy deterrent.

Figure 10:
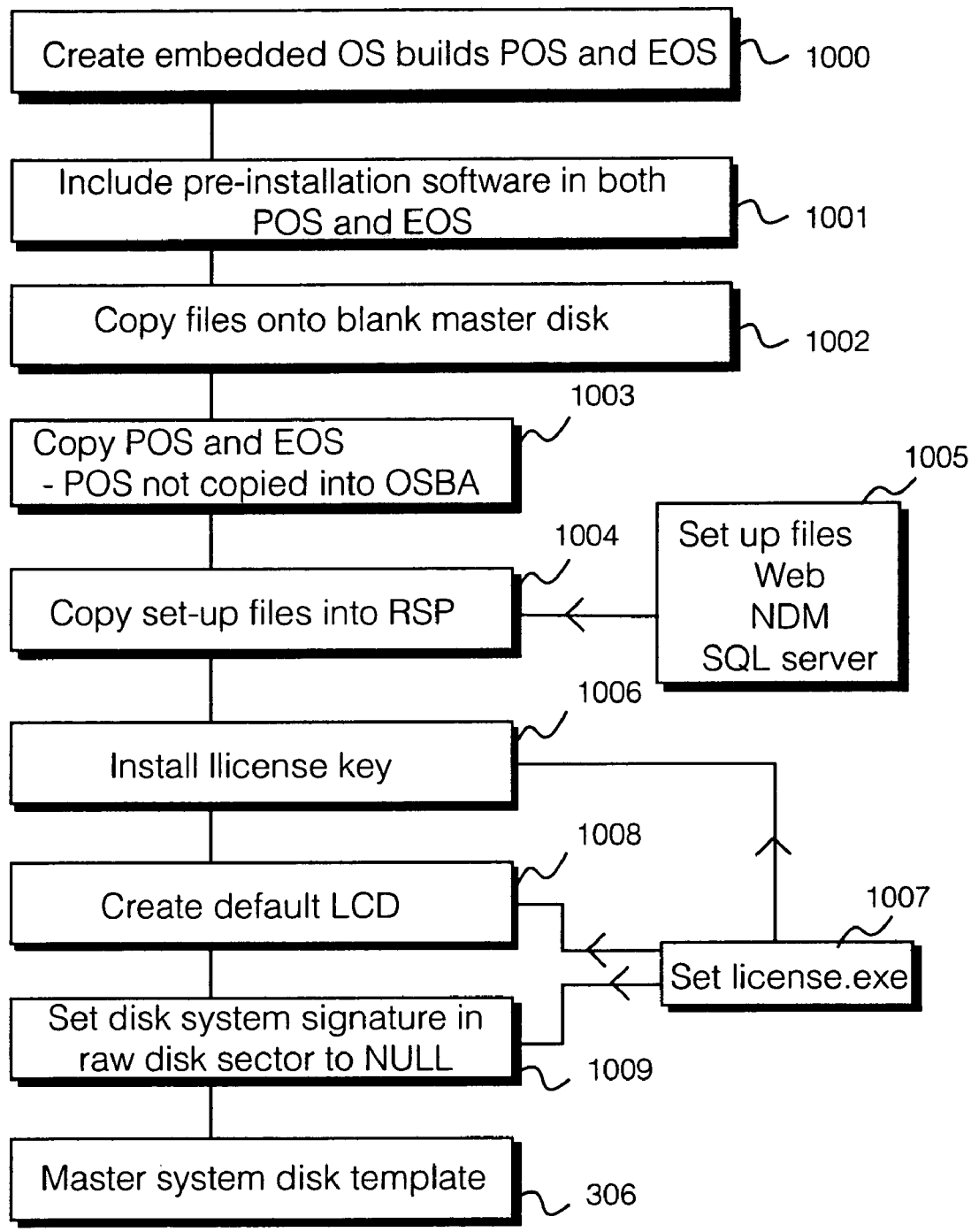
FIG. 10 illustrates schematically a flow diagram of procedural steps forming part of the build system.

Referring to FIG. 10 herein there is illustrated a flow diagram of the process within the build system 301. At stage 1000 a user via a user interface terminal creates an embedded operating system build for the primary operating system and the emergency operating system. The pre-installation software is installed in both the primary operating system and the emergency operating system at stage 1001, this software being configured to control the pre-installation system process 302. The primary operating system and emergency operating system data files, together with any drivers are copied onto the blank master disk at stage 1002 into the relevant partitions described in FIG. 7. The primary operating system and emergency operating system files are subsequently copied from the build operating system 600 to the blank master disk at stage 1003. However, at this stage the primary operating system is not copied into the operating system back-up area. The set-up files required for the application software are copied into the reserved space partition, these set-up files being, for example, the pre-installation software set-up files, with software set-up files, client back-up software set-up files and SQL server set-up files 1005 at stage 1004. The license key is installed onto the disk at stage 1006 directly onto a raw disk sector 900 by using a suitable program, for example, license.exe 1007 at stage 1008, together with the setting of a system signature in a raw disk sector to null at stage 1009. The result of the build system is the creation of a master system disk template. The build system 301 is configured to create master data disk templates using the stages as described above. The installing of a particular license key at 1006 is dependent upon the blank master disk storage capacity. In step 1008, a bit map graphic file is copied onto the master disk, and this bit map may be displayed on the liquid crystal display during normal running of the computer entity, and will show an identification number of the computer entity and a license level of the computer entity, the license level being determined by a license key which is copied onto the master disk.

Figure 11:
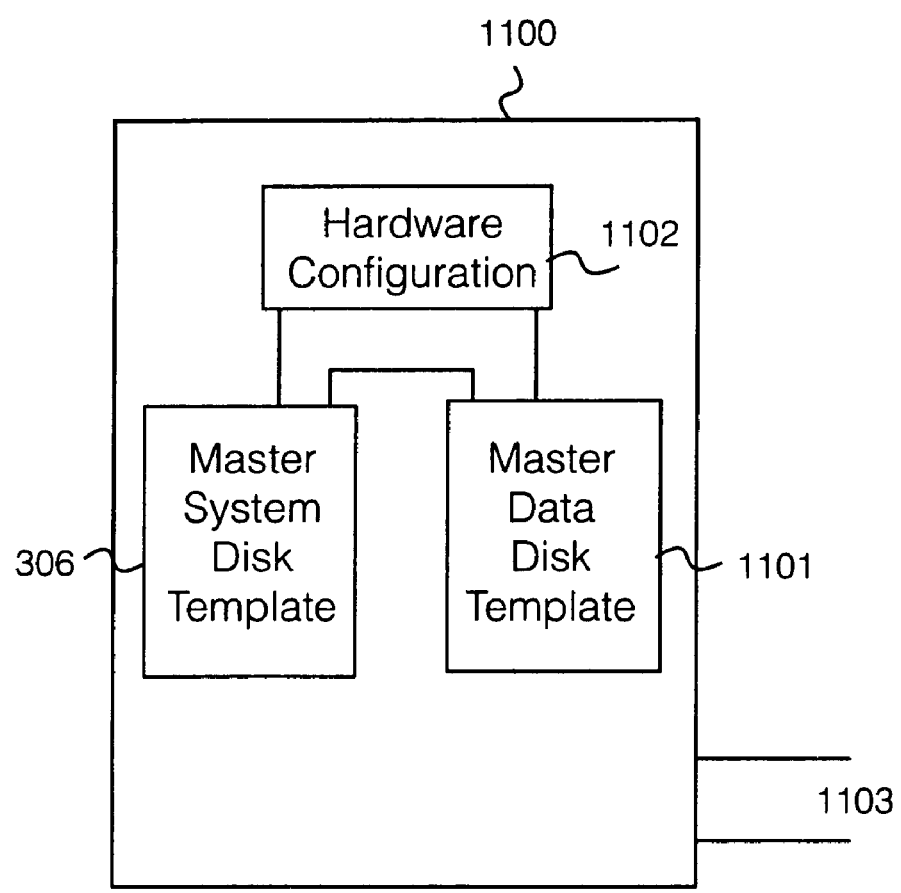
FIG. 11 illustrates schematically selected components of a pre-installation system configured to create a master system disk from a master system disk template.

Referring to FIG. 11 there is illustrated in more detail selected components of the pre-installation system according to a first embodiment of the present invention. FIG. 11 details a headless computer entity 1100 comprising a master system disk template 306 and a master data disk template 1101. The headless computer entity 1100 has a specific hardware configuration 1102 and suitable connection means 1103 being configured to connect the computer entity to, for example, a user interface. In a second preferred embodiment of the present invention, the pre-installation system is configured without the inclusion of the master data disk template 1101.

Figure 12:
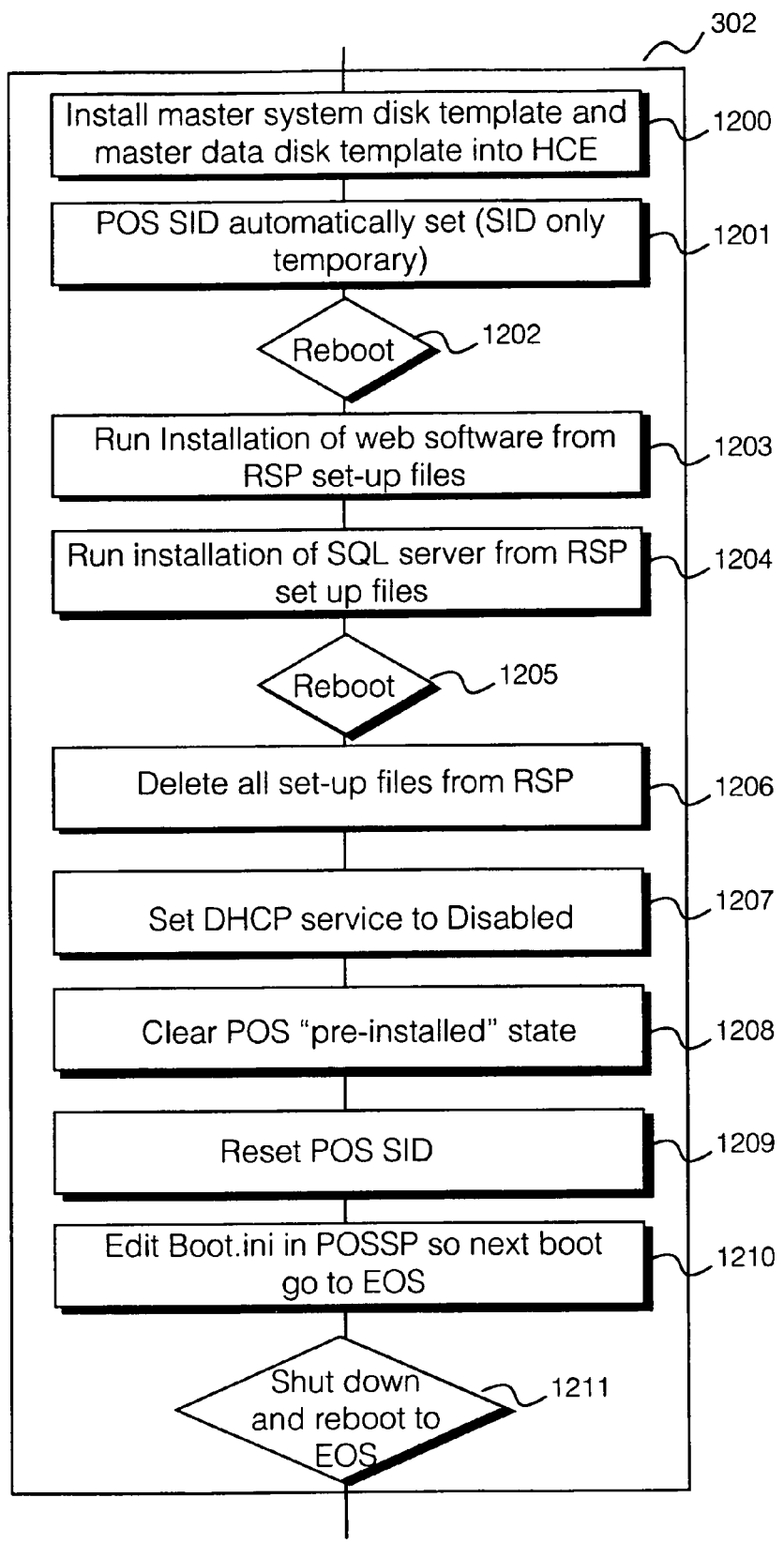
FIG. 12 illustrates schematically a flow diagram detailing procedural steps of the pre-installation system.

Referring to FIG. 12 there are illustrated details of the stages of the pre-installation system process 302 according to the preferred implementation of the present invention comprising both a master system disk template and a master data disk template 306 and 1101, respectively. The master system disk template and master data disk templates are installed into the headless appliance at stage 1200. A temporary primary operating system identification is set at stage 1201. The headless computer is then re-booted at stage 1202. The installation software, for example, for web administration pages and an SQL server, is run from the reserved space partition so as to create, for example, web administration page software and SQL server software at stages 1203 and 1204, respectively. Additionally, at stages 1204 and 1205, the pre-installation software is installed from the reserved space partition set-up file, together with the client back-up software. The headless computer is re-booted at stage 1205. The set-up files within the reserved space partition are deleted at stage 1206. The headless computer entity is disabled from the network or user interface at stage 1207. The primary operating system is cleared for the 'pre-install' state at stage 1208 such that the pre-installation system can continue the process of creating a master system disk image. A primary operating system system identification is reset so that a unique system identification will be automatically generated on the next primary operating system boot at stage 1209. The resetting of the primary operating system system identification involves the editing of a boot file within the primary operating system system partition 701, this boot file being, for example, boot.ini at stage 1210. The editing of the boot.ini file configures a computer 105 such that the next boot of the computer will be using the emergency operating system. The computer entity 105 is then shut down and rebooted using the emergency operating system at stage 1211. Stages 1200 to 1210 are controlled by the pre-installation software of the primary operating system.

Figure 13:
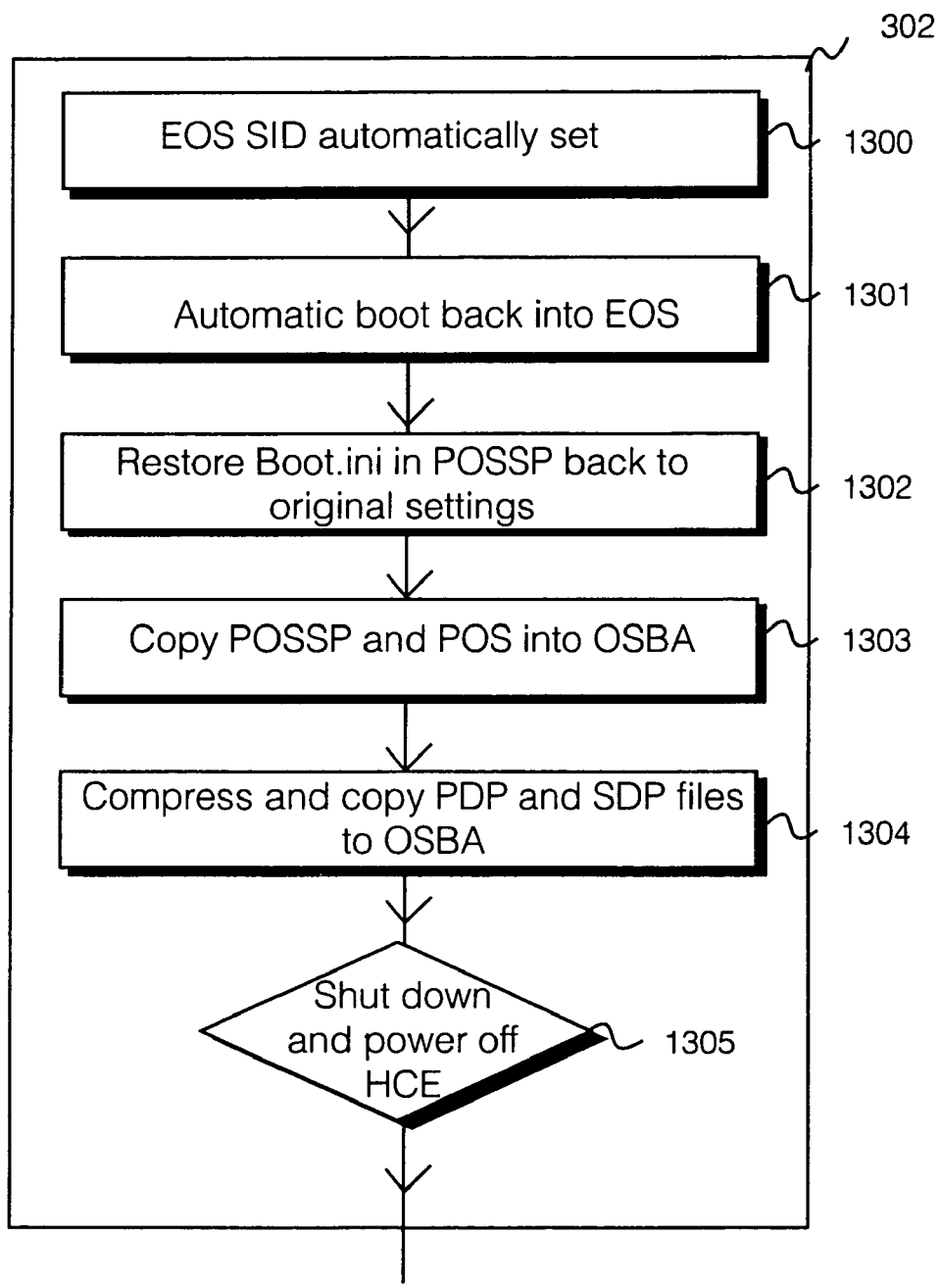
FIG. 13 further details the procedural steps of the pre-installation system.

Referring to FIG. 13, there is illustrated the final stages of the pre-installation system 302. Following the rebooting of the computer 105 from the emergency operating system at stage 1211 of FIG. 12, the emergency operating system system identification is automatically set at 1300. The system identification of the emergency operating system is intended to be a permanent system identification and is specific to the hardware of the headless computer entity within which the master system disk template 306 is installed. The headless computer is automatically booted using the emergency operating system at stage 1301. The boot.ini file is stored back to its original settings within the primary operating system system partition by the pre-installation software of the emergency operating system at stage 1302. The primary operating system system partition and primary operating system are copied into the operating system back-up area at stage 1303 such that the operating system back-up area contains the selected major components detailed in FIG. 8. The operating system back-up area following stage 1303 contains a known good uncorrupted version of the primary operating system, this primary operating system copy being capable of rebuilding the primary operating system as and when required at stage 1304 the primary data partition and secondary data partition files are copied and compressed to the operating system back-up area. The headless computer entity is then shut down and powered off at stage 1305. Stages 1300 to 1305 are controlled by the pre-installation software of the emergency operating system.

Following stage 1305 the master disk template has now been transformed into a master system disk image which is now capable of being cloned to provide a plurality of master system disk images.

Figure 14:
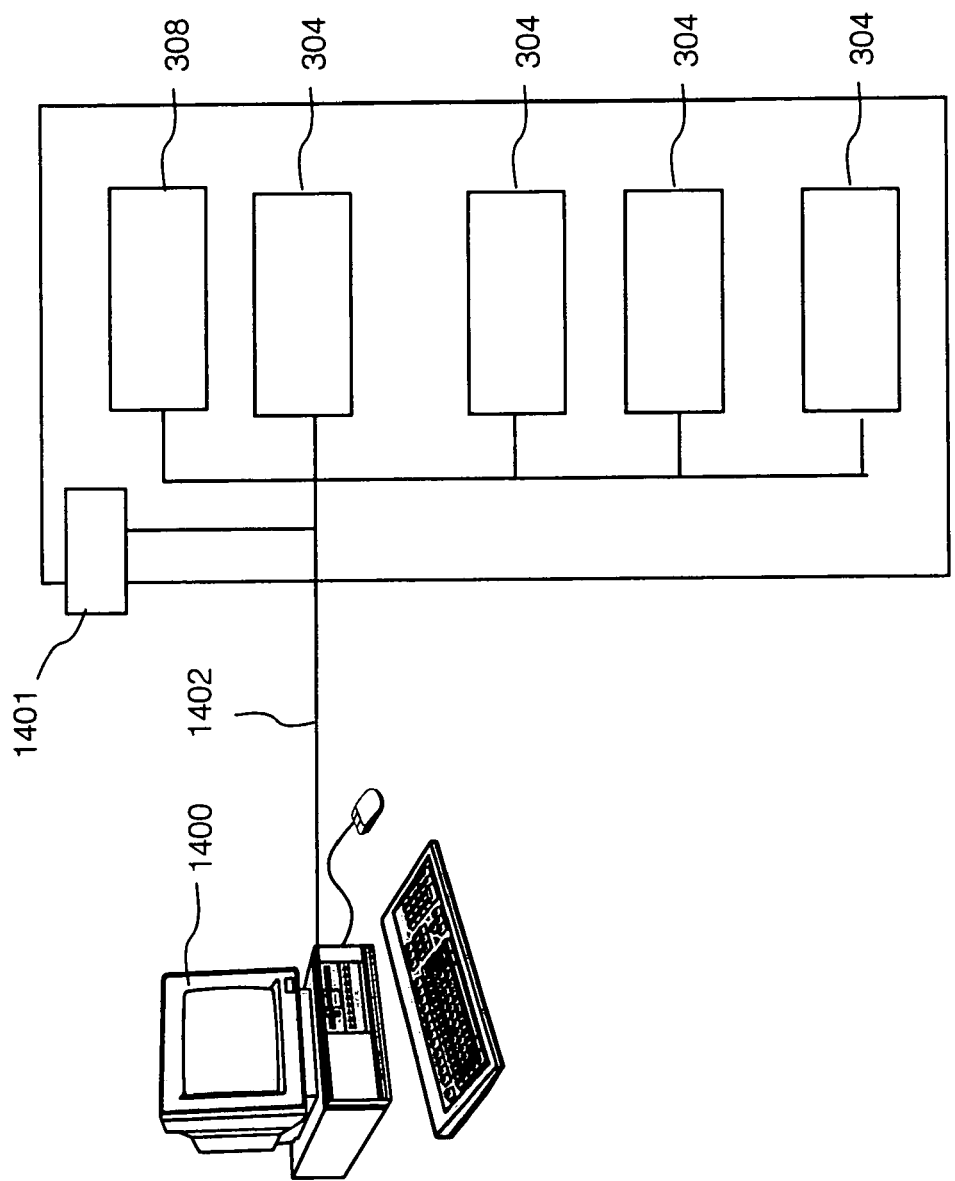
FIG. 14 illustrates schematically selected components for a cloning stage of the master system disk.

Referring to FIG. 14, there is illustrated schematically, by way of example only, components required to clone the master system disk image. In this particular example, the major components of the cloning system comprise a user interface 1400, a plurality of blank master disks 304, the master system disk image 308, a floppy disk drive 1401 and suitable communications link 1402. Using software on a floppy disk within the floppy disk drive 1400 a user via user interface 1400 is capable of generating a plurality of cloned master system disk images, such cloned master system disk images being exact replicas of the original master system disk image 308.

Figure 15:
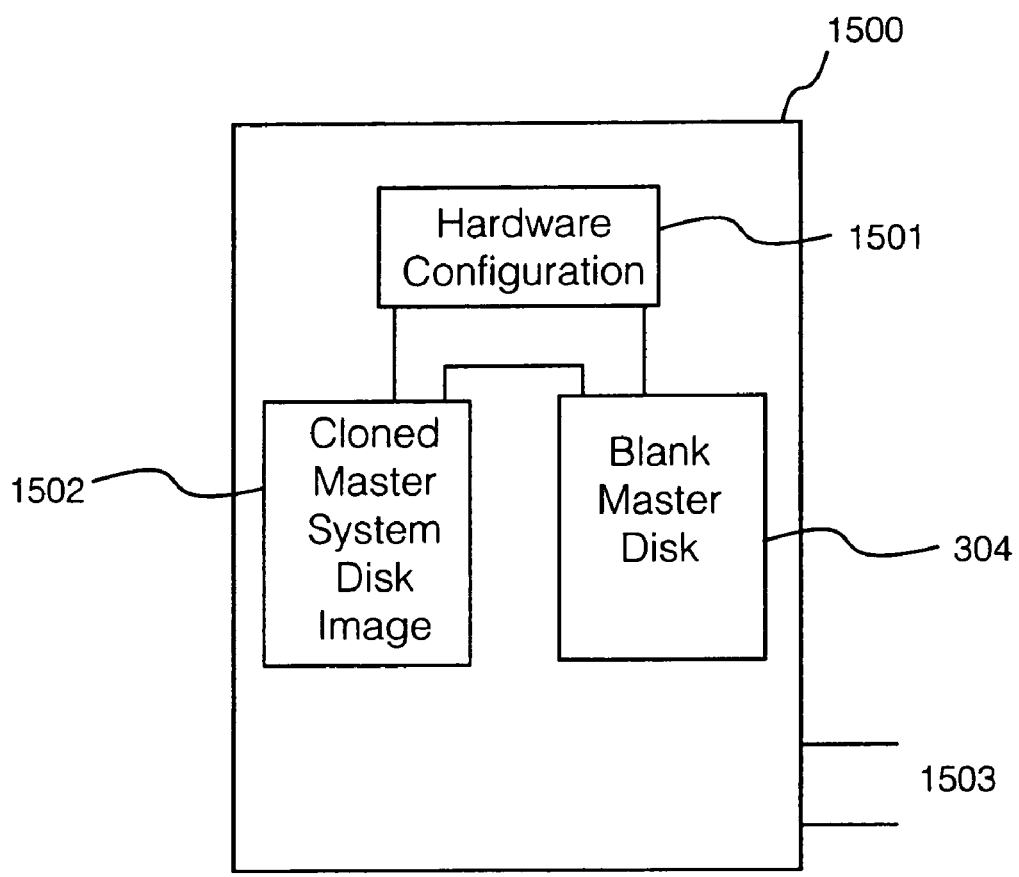
FIG. 15 illustrates schematically selected components for the initializing system configured to initialize a master system disk with a unique system identification.

Referring to FIG. 15, there is illustrated schematically selected major components of the initializing system 303. FIG. 15 details a headless computer entity 1500 having a specific hardware configuration 1501. Computer 1500 comprises a cloned master system disk image 1502 and a blank master disk 304. The computer 1500 is further configured with suitable connection means 1503, e.g. a local area network port. The initializing system 303 is configured such that the blank master disk 304 may comprise a second cloned master system disk image or a final fully initialized master system disk.

Figure 16:
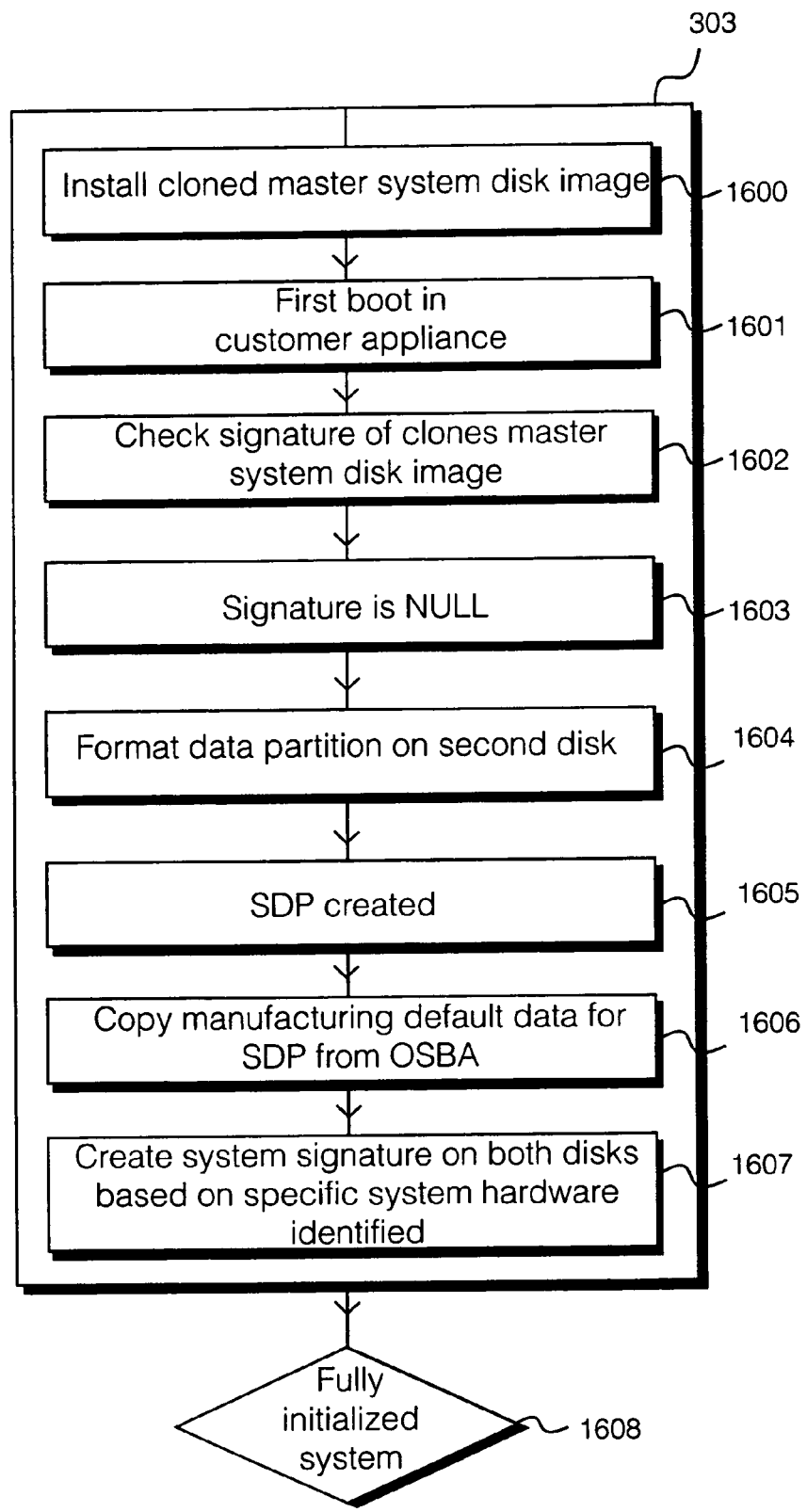
FIG. 16 illustrates schematically a further diagram detailing the procedural steps for the initializing system.

Referring to FIG. 16, herein there is illustrated selected stages of the initializing system process 303. The cloned master system disk image is installed within the headless computer appliance at stage 1600. The HCE (a customer appliance) is first booted at stage 1601. Primary operating system software then checks the system identification of the cloned master system disk image at stage 1602, such that as this is the first time the cloned master system disk image has been booted the software will detect a blank system signature at stage 1603. The cloned master system disk image then formats the data partition on the second disk 304 (of FIG. 15) at stage 1604. If disk 304 (of FIG. 15) contains information and/or disk partitioning, stage 1604 would create a blank master disk which is then subsequently formatted with the correct partition architectures. The secondary data partition is created at stage 1605, and then the manufacturing default data of the secondary data partition is then copied from the operating system back-up area into the newly created secondary data partition at stage 1606. The software then creates a specific system signature on both the cloned master system disk image 1501 and the second disk 304 based on a specific system hardware signature at stage 1607. A typical specific system hardware signature being, for example, a hardware signature in the ethernet chip on a motherboard. Following stage 1607 a master system disk 312 and a master data disk 313 are generated resulting in a fully initialized system 1608. The fully initialized system is now ready for customer use.

The invention claimed is:

1. A method of manufacture of an operating system master template for installing at least one operating system onto a computer entity, said manufacturing method comprising the steps of:
    installing a primary operating system on a first partition of a data storage device;
    installing a secondary operating system on a second partition of said data storage device; and
    installing an installation component on a third partition of said data storage device;
    wherein said first, second, and third partitions of said data storage device are separate from each other; and
    wherein said secondary operating system is installed on said second of said plurality of partitions of said data storage device only upon said primary operating system being installed on said first of said plurality of partitions of said data storage device and while the primary operating system is in a non-running static state.

2. The method as claimed in claim 1, wherein said installation component comprises:
    database installation sub-components configured for installation of database onto said computer entity.

3. The method as claimed in claim 1, wherein said installation component comprises:
    a back-up application sub-component for installation of a back-up application onto said computer entity.

4. The method as claimed in claim 1, wherein said installation component comprises:
    a plurality of set up data files for set up of said primary operating system; and
    a set up data file installation component for installing said set up data files onto said computer entity, and for deletion of said set up data files after a successful set up of said primary operating system.

5. The method as claimed in claim 1, wherein said installation component comprises:
    a plurality of set up data files for set up of said secondary operating system; and
    a set up data file installation component for installing said set up data files onto said computer entity and for deletion of said set up data files after a successful set up of said secondary operating system.

6. The method as claimed in claim 1, wherein the method is performed by a conventional computer including a processor, a memory, a display, and a mouse in response to operator inputs, and the template is for forming a master system disk for a headless computer for use with a network, the method further including:
    installing the master system disk template and a master data disk template into the headless computer;
    with the master system disk template and the master data disk template installed into the headless computer, causing the headless computer to create administration page software of the headless computer from set-up files in the installation component on the third partition.

7. A method of manufacture of a computer entity, said computer entity comprising at least one data processor and at least one data storage device, said method comprising the steps of:
    partitioning said data storage device into a plurality of partitions;
    installing a primary operating system onto a first of said plurality of partitions of said data storage device;
    installing a secondary operating system onto a second of said plurality of partitions of said data storage device;
    installing an installation component onto a third of said plurality of partitions of said data storage device; and
    after installation of said primary and secondary operating systems, deleting said installation component wherein said first, second, and third partitions of said data storage device are separate from each other; and
    wherein said secondary operating system is installed on said second of said plurality of partitions of said data storage device only upon said primary operating system being installed on said first of said plurality of partitions of said data storage device and while the primary operating system is in a non-running static state.

8. The method of manufacture as claimed in claim 7, further comprising the step of:
    running a program to set up license key data on a further partition of said plurality of partitions of said data storage device.

9. The method as claimed in claim 7, wherein said third partition onto which said installation component is installed comprises a reserved space partition, which is separate from said first and second partitions on which said primary and secondary operating systems are installed.

10. The method as claimed in claim 7, wherein said step of installing said installation component comprises:
    installing a database installation component for installing a database onto said computer entity.

11. The method as claimed in claim 7, wherein said step of deleting said installation component comprises deleting a database installation component after a successful installation of a database on said computer entity.

12. The method as claimed in claim 7, wherein said step of installing said installation component comprises:
    installing a back-up program installation component for installing a back-up program on said computer entity.

13. The method as claimed in claim 7, wherein said step of deleting said installation component comprises:
    deleting a back-up program installation component after a successful installation of a back-up program onto said computer entity.

14. The method as claimed in claim 7, further comprising the step of:
creating system identification data on said data storage device, wherein said system identification data uniquely identifies a relationship between said operating system and said computer entity.

15. A computer entity product comprising a data storage device, said computer entity manufactured by a method comprising the steps of:
partitioning said data storage device into a plurality of partitions;
installing a primary operating system onto a first partition of said plurality of partitions of said data storage device;
installing a secondary operating system onto a second partition of said plurality of partitions said of said data storage device;
installing an installation component onto a third partition of said plurality of partitions of said data storage device; and
after installation of said primary and secondary operating systems, deleting said installation component from said data storage device;
wherein said first, second, and third partitions of said data storage device are separate from each other; and
wherein said secondary operating system is installed on said second of said plurality of partitions of said data storage device only upon said primary operating system being installed on said first of said plurality of partitions of said data storage device and while the primary operating system is in a non-running static state.

16. A method of producing a production version of an operating system for installation into a production version computer entity, said method comprising the steps of:
creating an operating system master template having a plurality of partitions, wherein a primary operating system is stored on a first of said plurality of partitions, a secondary operating system is stored on a second of said plurality of partitions, and an installation component is stored on a third of said plurality of partitions;
loading said operating system master template into a mastering computer entity to create a master disk image of said operating system master template on said mastering computer entity; and
replicating said master disk image by loading said master disk image from said mastering computer entity onto said production computer entity;
wherein said first, second, and third partitions of said operating system master template are separate from each other; and
wherein said secondary operating system is installed on said second of said plurality of partitions of said master disk only upon said primary operating system being installed on said first of said plurality of partitions of said master disk and while the primary operating system is in a non-running static state.

17. The method as claimed in claim 16, wherein:
said replicated master disk image loaded onto said production computer entity operates to:
install said primary operating system onto a first partition of said production computer entity;
install said secondary operating system onto a second partition of said production computer entity; and
self-delete said installation component after a successful loading of said primary and secondary operating systems onto said production computer entity.

18. The method as claimed in claim 16, wherein said installation component comprises:
a back-up program installation component for installing a back-up program.

19. The method as claimed in claim 16, wherein said installation component comprises:
a database installation component for installing a database onto said production computer entity.

20. The method as claimed in claim 16, wherein, during said step of replicating said loaded master disk image by loading onto said production computer entity, said installation component is installed on a third partition of said production computer entity.

21. The method as claimed in claim 16, wherein said step of replicating said loaded master disk image from said mastering computer entity onto said production computer entity comprises:
creating a plurality of partitions on a data storage device of said production computer entity.

* * * * *